(12) United States Patent
Veglio

(10) Patent No.: US 10,154,677 B2
(45) Date of Patent: Dec. 18, 2018

(54) POURING BATCHING DEVICE FOR FAT-CONTAINING SUBSTANCES, IN PARTICULAR FOR CHOCOLATE

(71) Applicant: LIVE-TECH S.R.L., Alba (IT)

(72) Inventor: Domenico Veglio, Alba (IT)

(73) Assignee: LIVE-TECH S.R.L. (IT)

( * ) Notice: Subject to any disclaimer, the term of this patent is extended or adjusted under 35 U.S.C. 154(b) by 90 days.

(21) Appl. No.: 15/319,330

(22) PCT Filed: Jun. 18, 2015

(86) PCT No.: PCT/IT2015/000158
§ 371 (c)(1),
(2) Date: Dec. 15, 2016

(87) PCT Pub. No.: WO2015/193928
PCT Pub. Date: Dec. 23, 2015

(65) Prior Publication Data
US 2017/0150735 A1 Jun. 1, 2017

(30) Foreign Application Priority Data
Jun. 18, 2014 (IT) .............. TO2014A0482

(51) Int. Cl.
*A23G 1/20* (2006.01)
*A23G 1/04* (2006.01)

(52) U.S. Cl.
CPC .............. *A23G 1/206* (2013.01); *A23G 1/045* (2013.01); *A23G 1/205* (2013.01)

(58) Field of Classification Search
CPC ......... A23G 1/205; A23G 1/206; A23G 1/045
See application file for complete search history.

(56) References Cited

U.S. PATENT DOCUMENTS

| | | |
|---|---|---|
| 1,696,845 A | 12/1928 | Hislop |
| 4,538,978 A | 9/1985 | Cervoni |
| 6,733,256 B1 | 5/2004 | Knobel |

FOREIGN PATENT DOCUMENTS

| | | |
|---|---|---|
| DE | 39 01 935 A1 | 8/1990 |
| EP | 2 353 401 A1 | 8/2011 |
| FR | 1 098 824 A | 8/1955 |
| WO | WO 91/18518 A1 | 12/1991 |

OTHER PUBLICATIONS

International Search Report for PCT/IT2015/000158, filed Jun. 18, 2015.

*Primary Examiner* — Seyed Masoud Malekzadeh
(74) *Attorney, Agent, or Firm* — Brinks Gilson & Lione; Ryan L. Marshall

(57) ABSTRACT

A pouring batching device (1), in particular for chocolate, in dies is described, comprising a case (2) inside which at least one cylindrical recess is obtained, in which a longitudinal shaft (7) is housed, to which at least one rotary piston (3) is fastened, means adapted to control the flow of said chocolate, wherein the case (2) is placed below a tank containing chocolate to be poured and is open towards its top, locating a hopper (8) adapted to put in contact an internal volume of the tank with the recess of the case (2), so that a mass of chocolate can easily descend by gravity inside the case (2) even without a sucking effect by the rotary piston (3).

20 Claims, 7 Drawing Sheets

POURING BATCHING DEVICE FOR FAT-CONTAINING SUBSTANCES, IN PARTICULAR FOR CHOCOLATE

REFERENCE TO EARLIER FILED APPLICATIONS

This application claims the benefit of the filing date of PCT Application No. PCT/IT2015/000158 filed 18 Jun. 2015 which claims priority to Italy Patent Application No. TO2014A000482 filed 18 Jun. 2014, the disclosures of which are hereby incorporated by reference in their entirety.

The present invention refers to a pouring batching device for fat-containing substances, in particular for batching and pouring melted chocolate into suitable dies.

The dies in which the mass of chocolate is poured are usually arranged on a conveyor belt, placed below such pouring batching device. The movement speed of the dies is related to the flow-rate of melted chocolate which is poured.

Application WO 9118518A1 discloses a machine for pouring chocolate, essentially composed of a hollow cylinder, inside which a rotary piston slides. The cylinder, which is immersed in chocolate and partially goes out of the bottom of the tank which contains it, is equipped with a first and a second row of holes obtained on the wall of the cylinder itself. The two rows are arranged so that, when the first row of holes is inside the tank, the second is facing outside the tank itself. Following an alternate rotation of the cylinder, the two rows cyclically exchange their position. The combined rotation of cylinder and piston is such as to create a depression next to the row of holes which faces the tank, sucking chocolate and creating an overpressure next to the row of holes which faces outside the tank, in order to let the previously sucked chocolate go out. In practice, through the first row of holes, which is inside the tank, the rotary piston generates the suction of the chocolate which enters the cylinder. When the foreseen amount of chocolate has entered the cylinder, the cylinder rotates, taking the first row outwards, then the piston expels the chocolate which is thereby poured into the dies below. While pouring occurs from the holes of the first row, suction of chocolate simultaneously occurs through the holes of the second row which, following the rotation of the cylinder, is now immersed in chocolate.

This prior art pouring batching device however has some inconveniences.

A first inconvenience consists in that the passage of chocolate through the holes occurs by suction of the chocolate itself, so that there is the risk of forming recesses and consequent defects in the molded pieces.

A second inconvenience consists in that there is the risk of dripping between a pouring and the following one, not being provided means adapted to suck the chocolate which remains in the pouring hole.

A third inconvenience consists in that, due to the fact that the pouring batching device is immersed in the tank, its extraction is complex and cumbersome.

A fourth inconvenience consists in the fact that, when chocolate is pumped outside, the pressure is exerted on the whole sucked amount, not on the single dose which must be poured in each die, so that batching differences between the dies could occur.

A fifth inconvenience is due to the fact that the hollow cylinder, inside which the rotary piston slides, is immersed into chocolate and partially goes out of the bottom of the tank which contains it. Taking into account that the cylinder rotates, a seal must be obtained between said cylinder and the bottom of the tank. Said seal is particularly critical when the row of holes obtained on the cylinder wall is next to the seal itself.

Documents U.S. Pat. No. 4,538,978 and U.S. Pat. No. 1,696,845 disclose prior art pouring batching devices.

Object of the present invention is solving the above prior ar problems, by providing a pouring batching device of the type comprising a case inside which a cylindrical recess is obtained, in which a longitudinal shaft is housed, to which at least one rotary piston is fastened, means being provided for controlling the flow of chocolate, wherein the case is placed below a tank containing the chocolate to be poured and is open towards its top, in order to locate a hopper adapted to put in contact the internal volume of said tank with the recess of the case itself, so that the mass of chocolate easily descends by gravity into the case, even without the sucking effect by said rotary piston.

Another object of the present invention is providing a pouring batching device in which the means adapted to control the flow of chocolate are also suitable to prevent, or at least limit, the dripping.

Another object of the present invention is making it possible to obtain a quick and easy replacement of the batching mechanism, without using tools, in order to quickly adapt the device to various productions.

Another object of the present invention is providing a pouring batching device which can be assembled below the tank, allowing an easy and quick assembling and removal thereof.

Moreover, an object of the present invention is providing a pouring batching device in which batching of chocolate to be poured is performed for every single die to be filled, thereby guaranteeing the uniformity of pouring.

The above and other objects and advantages of the invention, as will result from the following description, are obtained with a pouring batching device as claimed in claim 1. Preferred embodiment and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) could be made to what is described, without departing from the scope of the invention, as will appear from the enclosed claims.

The present invention will be better described by some preferred embodiments thereof, provided as a non-limiting example, with reference to the enclosed drawings, in which:

FIGS. 1(a) and 1(b) show with two different perspectives the pouring batching device according to the present invention;

Figure 1:
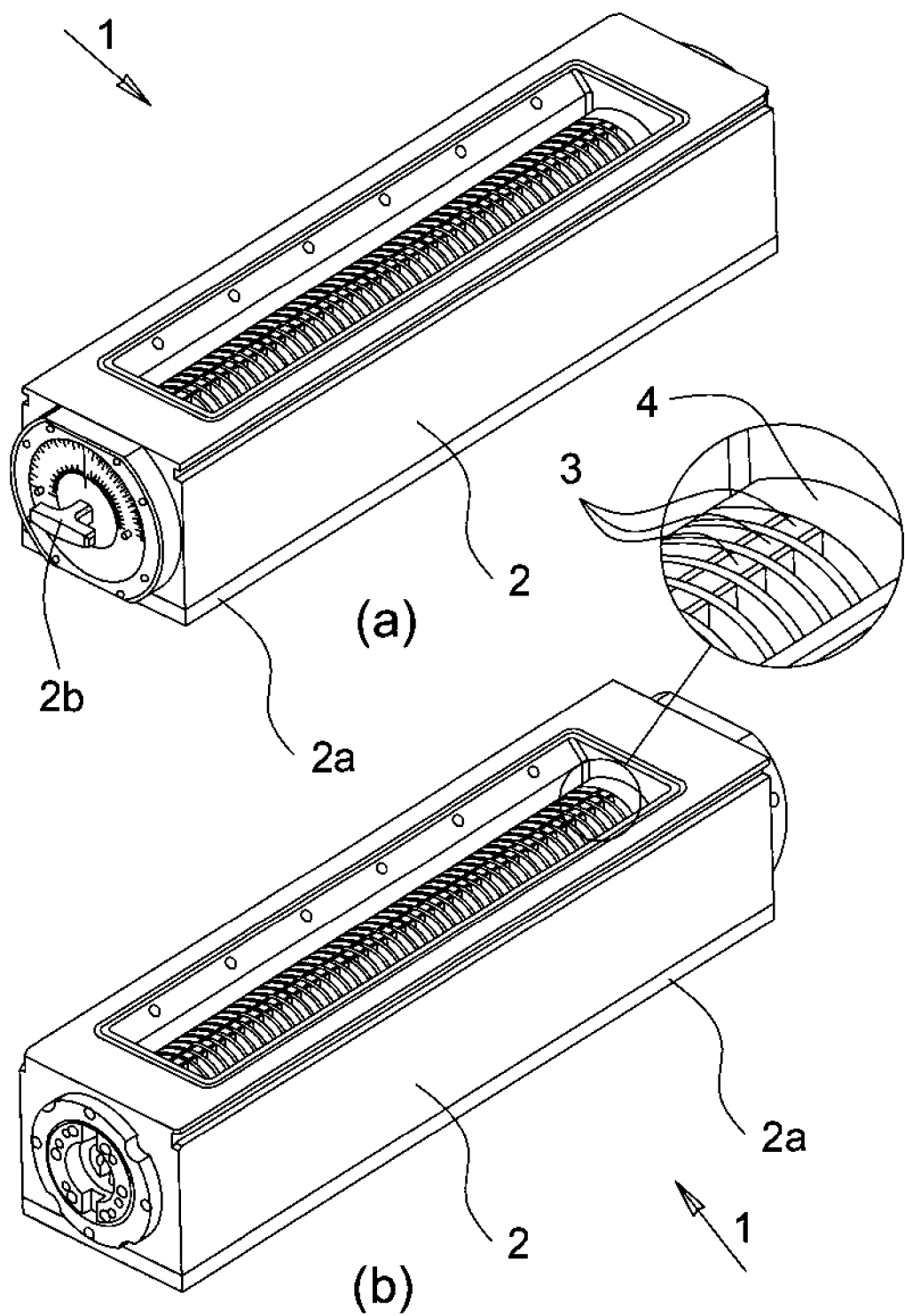

With reference in particular to FIGS. 1(a) and 1(b), with (1) it is possible to note a preferred embodiment of the pouring batching device 1, in particular for chocolate, according to the present invention. The device (1) is shown oriented towards the operator, in FIG. 1(a), and the motoring, in FIG. 1(b).

Figure 2:
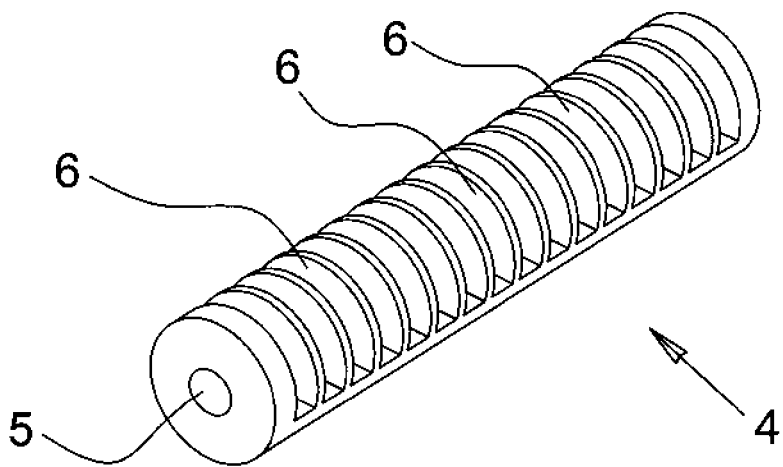
FIG. 2 shows a component of the pouring batching device according to the present invention.

The pouring batching device 1 comprises at least one case 2 inside which at least one rotary piston 3 and at least one valve 4 are housed, shown as a whole in the following FIG. 2.

Below the case (2), a plate (2a) is possibly assembled, whose function will be pointed out after.

The valve 4, which is inserted in a cylindrical seat obtained in case 2, has a generally cylindrical shape, with a coaxial hole 5 and a plurality of slots 6, with parallel flanks, each one of which locates a volume inside which the rotary pistons 3 slide. The pistons 3 are assembled on a shaft 7, inserted in the hole 5, obtained in the valve 4, and rotary with respect to it. The rotary pistons 3 then move with a rotary motion around the shaft 5 axis.

On the side oriented towards the operator, there is a handle 26 which allows removing, without using tools, the whole machine format and accessing inside the pouring batching device 1. This feature is particularly important, since it allows easily and quickly extracting the block composed of the valve 4, the rotary pistons 3 and the shaft 7 for replacement, format change and/or cleaning operations.

Figure 3:
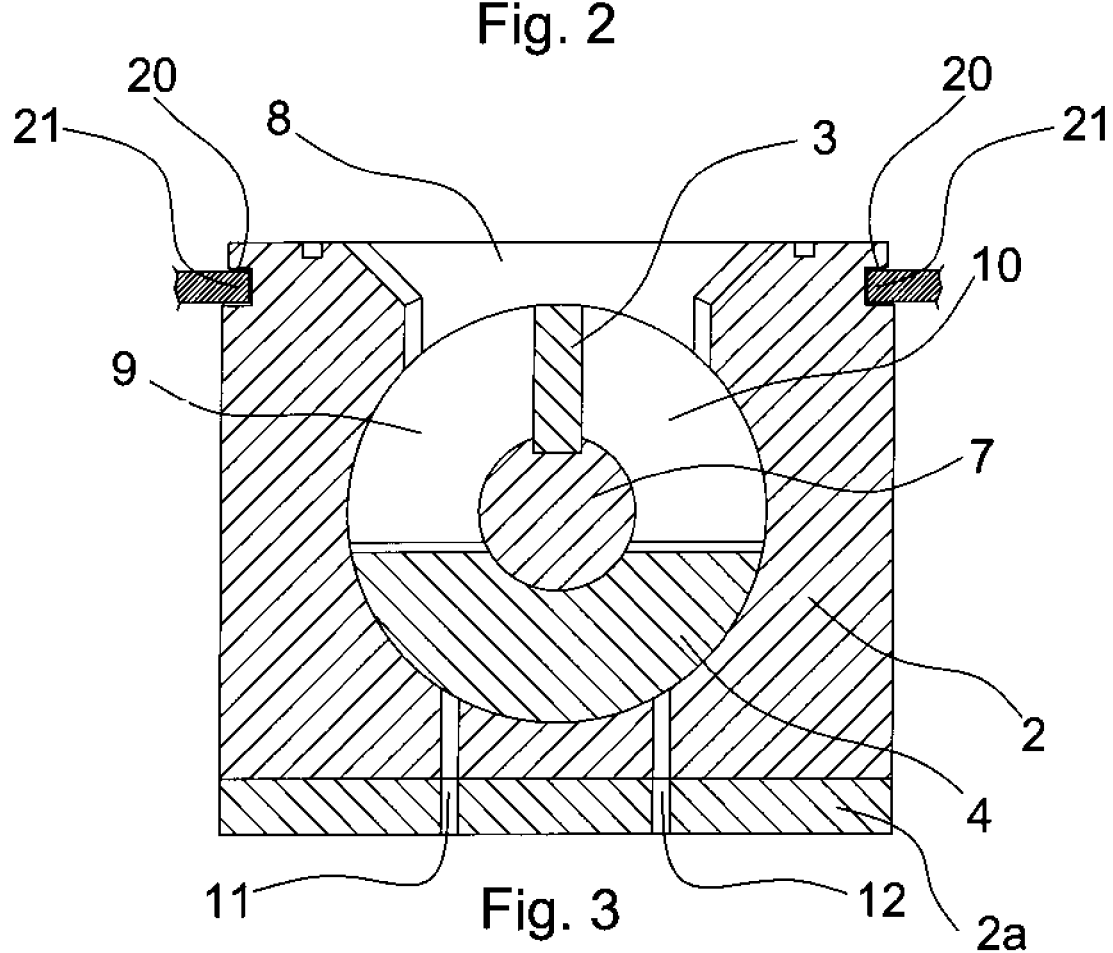
FIGS. 3 to 13 show cross sections of the pouring batching device according to the present invention in various operating steps thereof.

FIG. 3 shows a cross section of the pouring batching device 1, in which the shaft 7 can be seen, on which the piston 3 is assembled, both assembled inside the valve 4 which, in turn, is inserted in the cylindrical seat obtained in the case 2. The case 2 is open in its upper part in order to form a sort of hopper 8, in which liquid chocolate is poured. The piston 3 divides the slot in cui it is inserted into a first batching chamber 9 and a second batching chamber 10. In the lower part of the case 2, next to each slot 6 of the valve 4, at least one pouring channel for chocolate is obtained. According to a preferred embodiment, for each slot 6 a first channel 11 and a second channel 12 for pouring chocolate are obtained, such channels being symmetrical with respect to the longitudinal symmetry plane of the pouring batching device 1.

Figure 13:
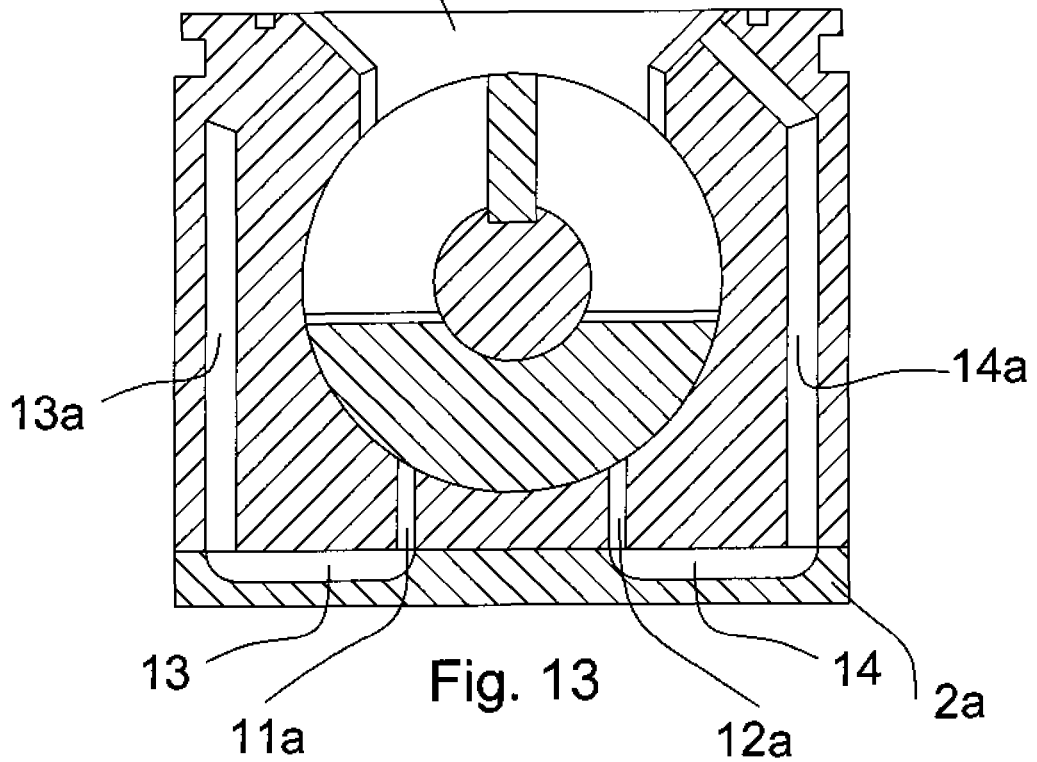

Said pouring channels 11 and 12 are therefore arranged on two arrays, each one of which comprises a number of pouring channels equal to the number of slots. Since it can happen that, for production needs, some of these channels must be closed, said plate 2a has the function of preventing chocolate from going out, by recycling it into the hopper 8. The following FIG. 13 shows a section of the pouring batching device 1 performed next to a pair of pouring channels 11a, 12a, not used. In such case, chocolate pumped through said pouring channels 11a and 12a, is recycled into the hopper 8 through the ducts 13 and 14 obtained in the plate 2a and 13a and 14a obtained in the case 2.

Next to the actually used channels 11 and 12, the plate 2a is drilled in order to be a sort of extension of said channels 11 and 12, as shown in the other Figures.

According to a preferred embodiment, the case 2 is equipped with grooves 20 which engage suitable guides 21 integral with an overhanging tank (not shown). The pouring batching device 1 according to the invention can thereby be easily assembled and disassembled on and from the machine as a whole.

In FIG. 3, the pouring batching device 1 is shown in its starting position, in which chocolate fills by gravity both batching chambers 9 and 10 and the valve keeps both pouring channels 11 and 12 closed.

Figure 4:
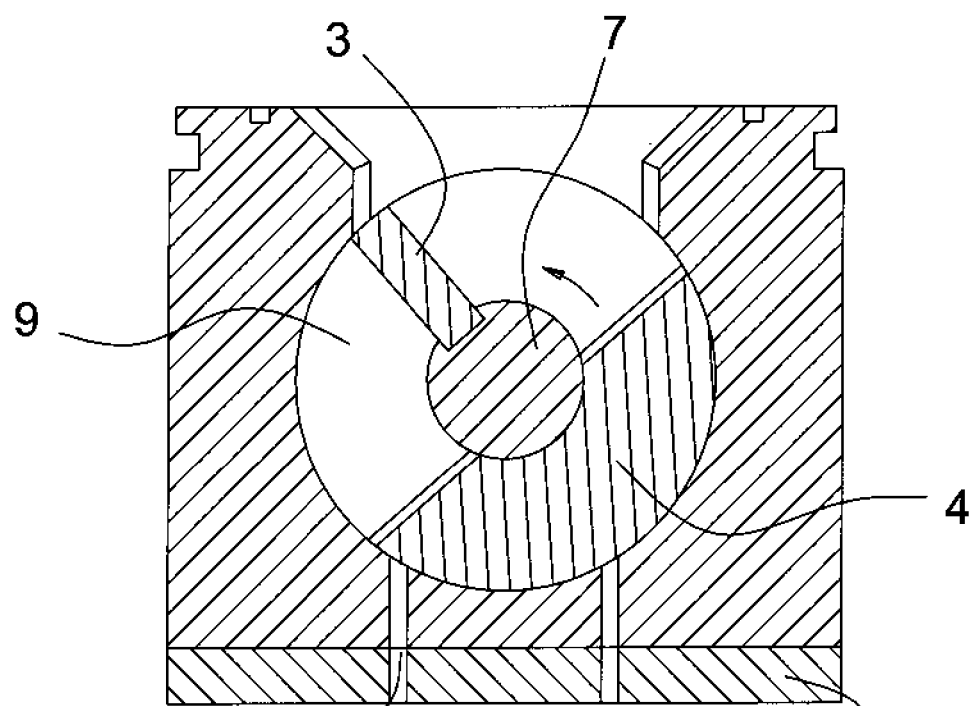

In FIG. 4, shaft 7 and valve 4 rotate anticlockwise, as shown by the arrow, and take the first batching chamber 9, delimited by piston 3, towards the first pouring channel 11, which however is kept closed since clogged by the valve 4. In this situation, the first batching chamber is delimited by valve 4 and piston 3, which has now closed the connection between hopper 8 and first batching chamber 9. By suitably choosing the position of the valve 4 related to one of the rotary piston 3, a determination can be made of the volume of the first batching chamber 9 and, therefore, of the amount of chocolate which will be poured. In practice, the valve 4 stops in such a position as to determine the volume of the first batching chamber 9, such volume being discovered when the rotary piston 3 closes the passage between hopper 8 and batching chamber 9.

Figure 5:
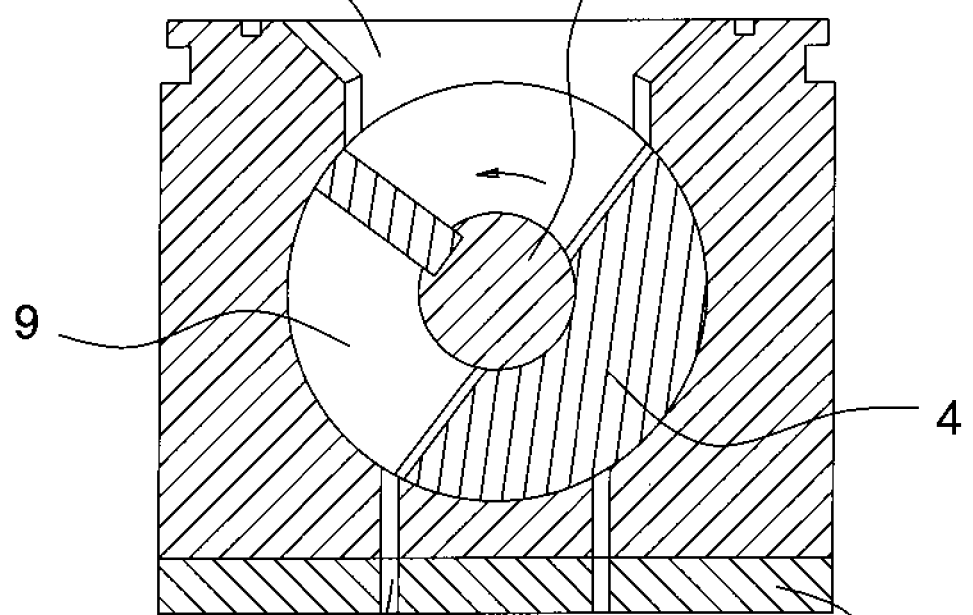

In FIG. 5, the rotation of the shaft 7 and of the valve 4 goes on, till the mouth of the first pouring channel 11 is uncovered, and is thereby communicated with the first batching chamber 9.

Figure 6:
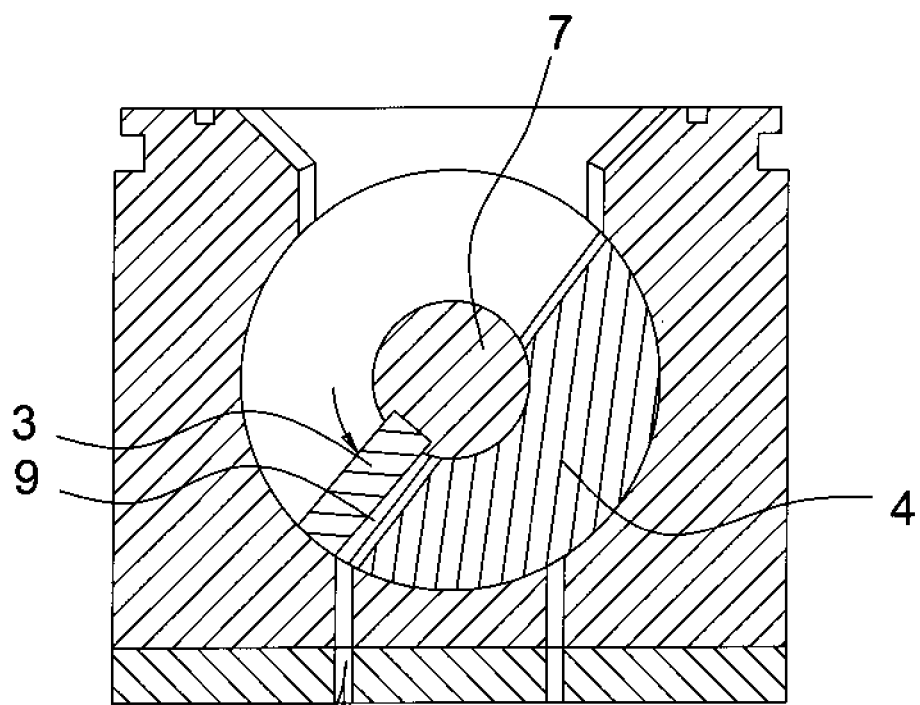

In FIG. 6, the valve 4 remains unmoving in the previous position, while the shaft 7 goes on rotating, in order to take the piston 3 in contact or almost in contact with the valve 4. In this way, the volume of the first batching chamber 9 is strongly reduced, and chocolate is pumped outside, through the first pouring channel 11.

Figure 7:
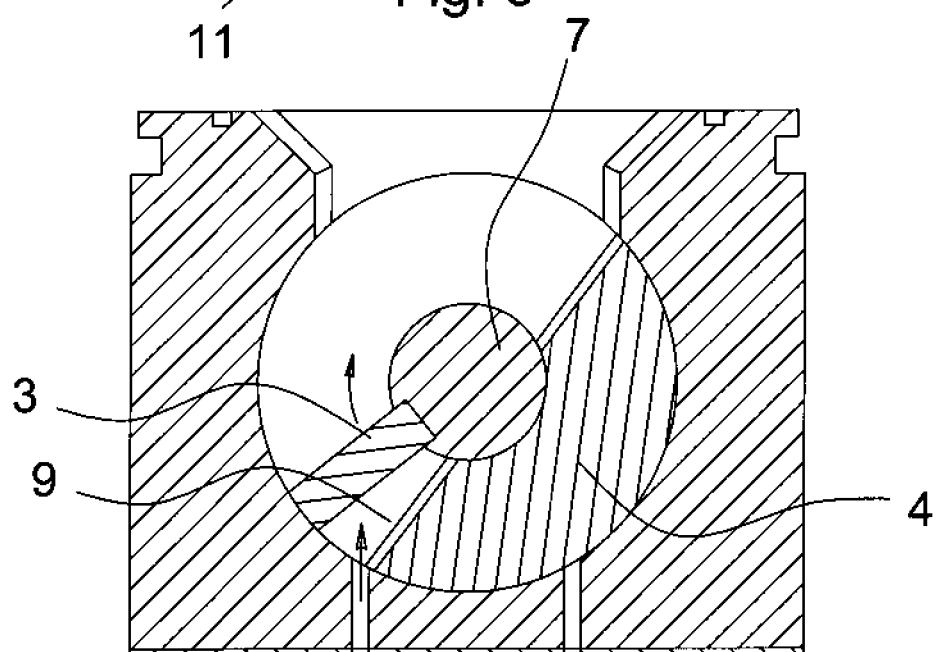

In FIG. 7, the shaft 7 reverses the rotation direction and the piston 3 starts the return stroke. In this situation, a piping is created in the first pouring channel 11, which makes the not yet poured chocolate get back, in order to fight against possible dripping and the consequent fouling of the below dies and conveyor belt.

Figure 8:
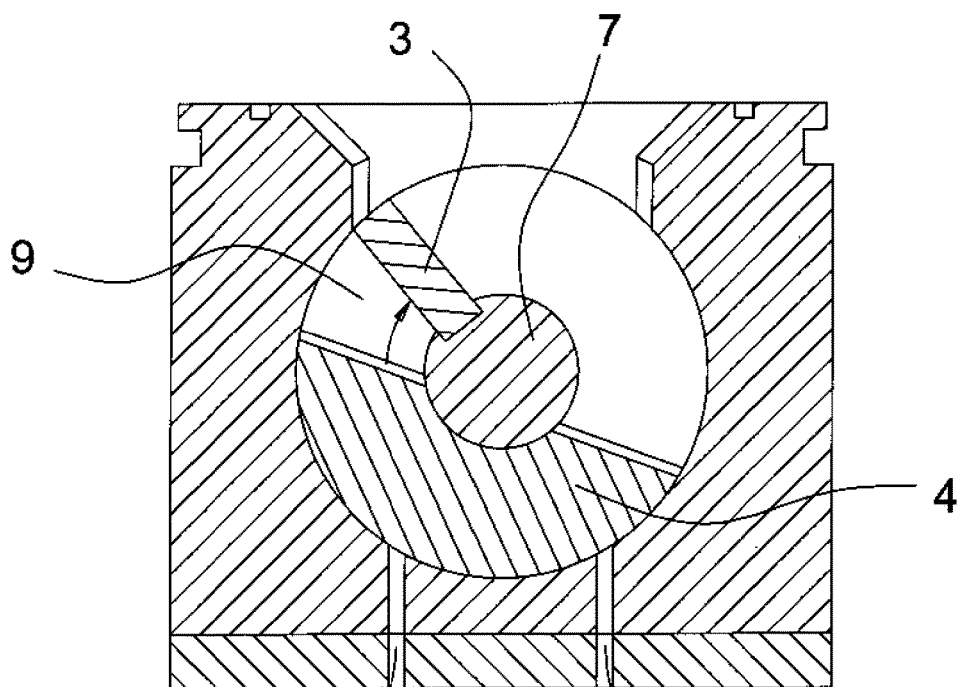

In FIG. 8, the rotation of the shaft 7 goes on and the rotation of the valve 4 starts, with following closure of the first pouring channel 11.

Figure 9:
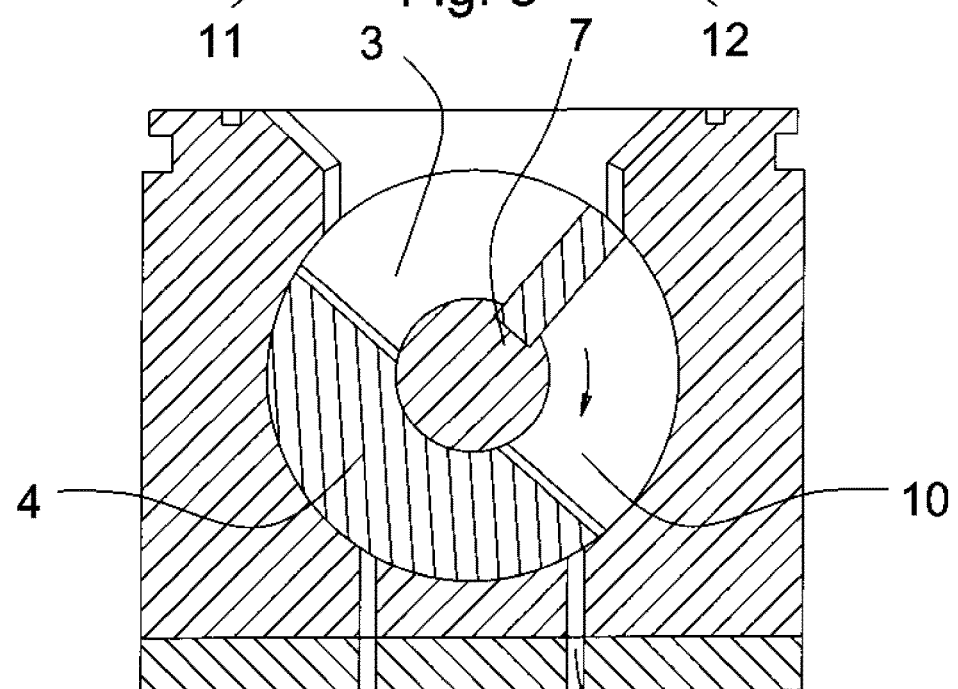

In FIG. 9, the rotation of the shaft 7 and of the valve 4 goes on. Also in this case, by adjusting the mutual position of the valve 4 and of the piston 3, the amount of chocolate to be poured, present in the second batching chamber 10, can be dosed.

Figure 10:
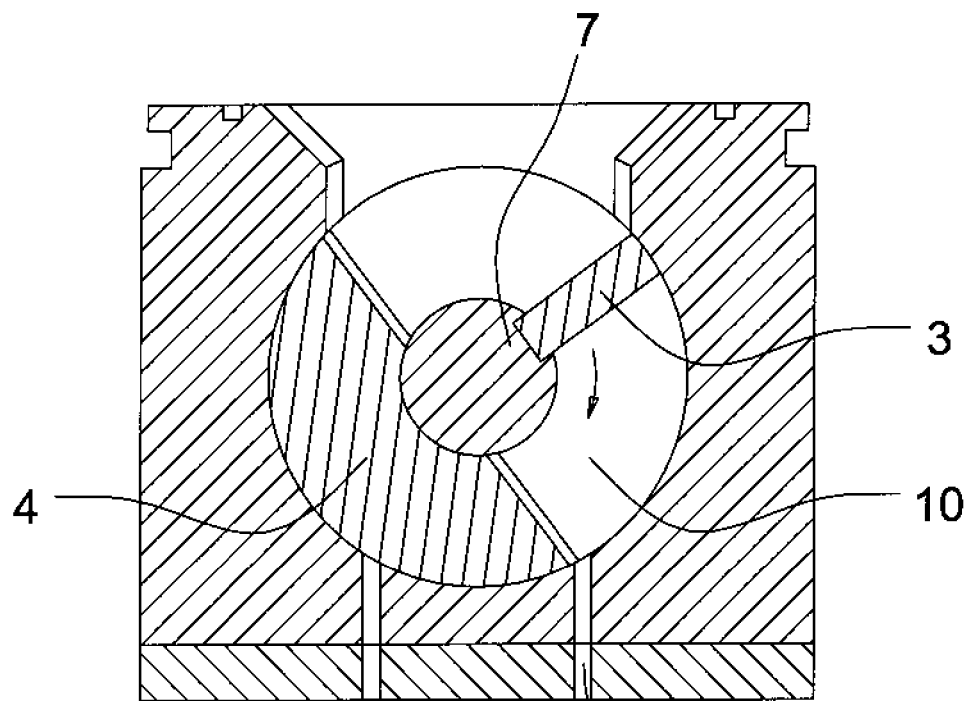

In FIG. 10, the rotation of the shaft 7 and of the valve 4 goes on, till the second pouring channel 12 is opened.

Figure 11:
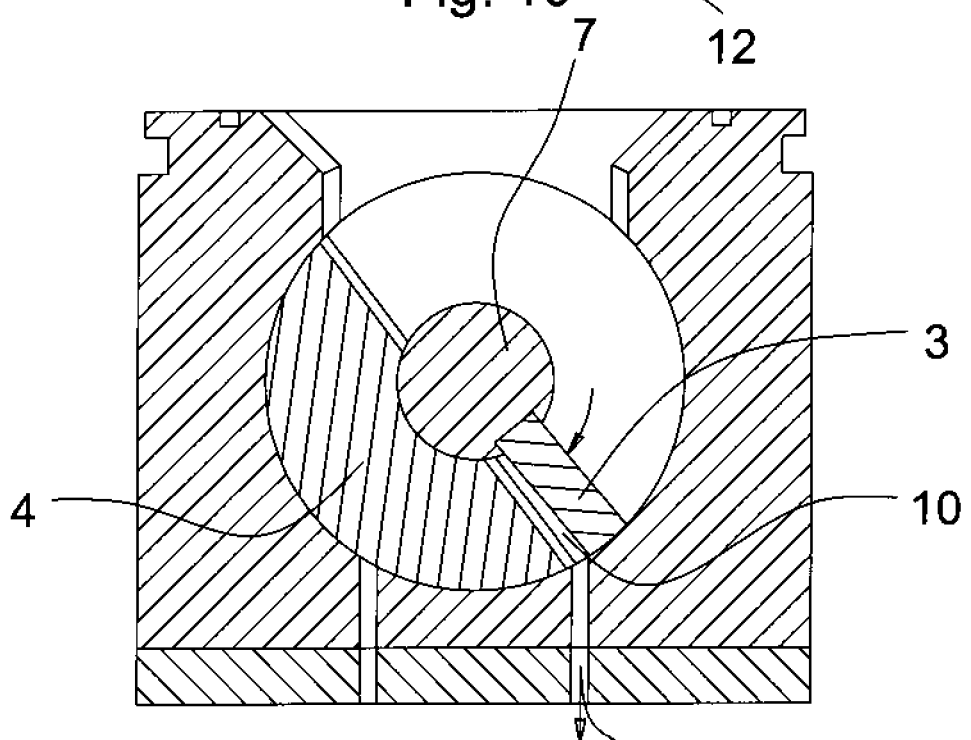

In FIG. 11, the valve 4 remains unmoving in its previous position, while the shaft 7 goes on rotating in order to take the piston 3 in contact or almost in contact with the valve 4. In this way, the volume of the second batching chamber 10 is strongly reduced and chocolate is pumped outside, through the second pouring channel 12.

Figure 12:
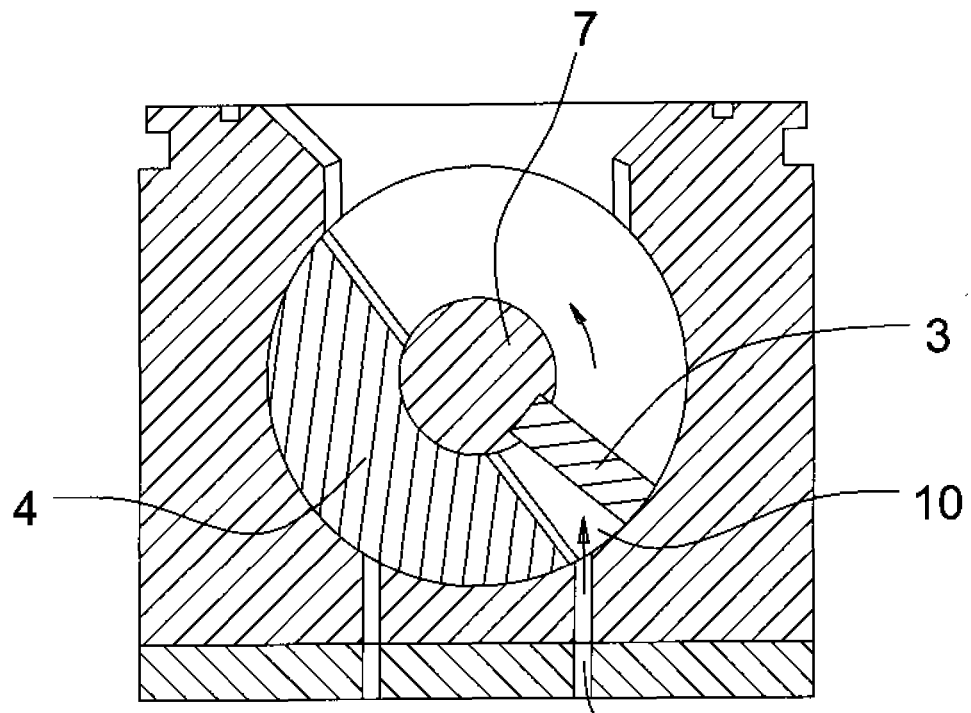

In FIG. 12, the shaft 7 reverses its rotation direction and the piston 3 starts its return stroke. In this situation, in the second pouring channel 12 a piping is created, which makes the not yet poured chocolate go back, in order to fight against possible dripping and the consequent fouling of the below dies and conveyor belt.

In FIG. 13, the starting situation is restored, with both pouring ducts 11 and 12 closed.

According to a preferred embodiment, the pouring channels of a row can be joined to form a single channel. In this way, a so-called tongue batching is performed, useful for example in case of filling imprints for chocolate tablets.

From the previous description, it is clear that the pouring batching device 1 according to the present invention manages to solve the above listed inconveniences. In particular, the way with which it is interfaced with the tank containing chocolate allows filling the batching chambers 9, 10 by gravity, even without the sucking effect. Moreover, the fact that the pouring batching device 1 is placed below the tank containing chocolate, instead of being immersed therein, allows an easy assembling and removal. Finally, the fact that a piping is generated in the pouring channel immediately after pouring, strongly reduces undesired dripping which foul the below dies and moving carpet.

The invention claimed is:

1. A batching device comprising:
a case comprising a hopper tapered toward a cylindrical recess of the case, the hopper in fluid communication with at least one internal duct of the case, and the cylindrical recess in fluid communication with at least one pouring channel, the at least one pouring channel configured to receive a substance that flows from the hopper and into the cylindrical recess;
a cylindrical valve disposed inside of the cylindrical recess, the cylindrical valve configured to rotate inside of the cylindrical recess about a shaft that extends through a coaxial hole of the cylindrical valve, the cylindrical valve including at least one slot;
a rotary piston fastened to the shaft and configured to rotate inside of the at least one slot with the shaft, wherein the rotary piston, the cylindrical valve, and the cylindrical recess define at least one batching chamber, wherein rotation of the rotary piston with the shaft and rotation of the cylindrical valve about the shaft changes a respective volume of the at least one batching chamber; and
a plate removably coupled to the case, the plate comprising at least one pouring duct in fluid communication with the at least one pouring channel and the at least one internal duct of the case, wherein the at least one pouring duct is configured to recycle the substance back to the hopper via the at least one internal duct of the case.

2. The batching device of claim 1, wherein the at least one pouring channel comprises a plurality of pouring channels and the cylindrical valve comprises a plurality of slots that define respective batching chambers in the cylindrical recess of the case, wherein the pouring channels comprise a separate pouring channel for each of the slots, the pouring channels being arranged in parallel rows.

3. The batching device of claim 2, wherein the pouring channels included in at least one of the rows are joined to form a single channel configured to perform a tongue-shaped pouring for filling imprints for tablets.

4. The batching device of claim 1, wherein the at least one pouring channel comprises a plurality of pouring channels being arranged in two parallel rows, the pouring channels comprising a first pouring channel and a second pouring channel, the first pouring channel and the second pouring channel both in fluid communication with the cylindrical recess.

5. The batching device of claim 1, wherein rotary piston and the cylindrical valve are rotatable to cause the cylindrical valve to close the at least one pouring channel and to cause the rotary piston to close a passage between the hopper and the at least one batching chamber.

6. The batching device of claim 1, wherein the rotary piston divides the at least one batching chamber into a first batching chamber and a second batching chamber, wherein the at least one pouring channel comprises a plurality of pouring channels, wherein rotation of the cylindrical valve causes the pouring channels to alternatively open, wherein rotation of the rotary piston causes a volume of the first batching chamber to increase and a volume of the second batching chamber to decrease.

7. The batching device of claim 1, wherein rotation of the rotary piston is configured to cause suction in the at least one pouring channels in response to a decrease of the respective volume of the at least one batching chamber.

8. The batching device of claim 1, wherein the case is configured to removably couple to a tank via a pair of grooves and corresponding guides, wherein the pouring batching device further comprises:
a handle positioned on a side of the pouring batching device, the handle configured to engage the corresponding guides to couple or decouple the pouring batching device from the tank.

9. The batching device of claim 1, wherein the at least one pouring channel comprises a first pouring channel and a second pouring channel and the at least one pouring duct comprises a first pouring duct and a second pouring duct wherein the first pouring duct is configured to receive the substance from the first pouring channel and convey the substance to the at least one internal duct, and the second pouring duct is configured to receive the substance from the second pouring channel and release the substance from the pouring batching device.

10. The batching device of claim 9, wherein the rotary piston is configured to cause suction in the second pouring duct in response to rotation of the rotary piston away from the second pouring channel.

11. The batching device of claim 1, wherein the substance is chocolate.

12. A batching device comprising:
a case comprising a hopper tapered toward a cylindrical recess of the case, the hopper in fluid communication with a plurality of internal ducts of the case, and the cylindrical recess in fluid communication with a plurality of pouring channels, the pouring channels configured to receive a substance that flows from the hopper and into the cylindrical recess;
a cylindrical valve disposed inside of the cylindrical recess, the cylindrical valve configured to rotate inside of the cylindrical recess about a shaft that extends through a coaxial hole of the cylindrical valve, the cylindrical valve including a plurality of slots;
a plurality of rotary pistons fastened to the shaft and configured to rotate with the shaft inside of each of the slots respectively, wherein each of the rotary pistons, the cylindrical valve, and the cylindrical recess define a plurality of batching chambers, wherein rotation of the rotary pistons with the shaft and rotation of the cylindrical valve about the shaft changes respective volumes of the batching chambers; and
a plate removably coupled to the case, the plate comprising a plurality of pouring ducts, each of the pouring ducts in fluid communication with a corresponding one of the pouring channels and a corresponding one of the internal ducts, wherein the pouring ducts are configured to recycle the substance back to the hopper via the internal ducts of the case.

13. The batching device of claim 12, wherein the pouring channels comprise a separate pouring channel for each of the slots, the pouring channels being arranged in parallel rows.

14. The batching device of claim 13, wherein the pouring channels included in at least one of the rows are joined to form a single channel configured to perform a tongue-shaped pouring for filling imprints for chocolate tablets.

15. The batching device of claim 12, wherein the pouring channels are arranged in two parallel rows, the pouring channels further comprising a first pouring channel in a first row and a second pouring channel in a second row, the first pouring channel and the second pouring channel both in fluid communication with at least one of the slots.

16. The batching device of claim 12, wherein rotary piston and the cylindrical valve are rotatable to cause the cylindrical valve to close at least one of the pouring channels and to cause the rotary piston to close a passage between the hopper and at least one of the batching chambers.

17. The batching device of claim 12, wherein at least one of the rotary pistons define a first batching chamber and a second batching chamber, and rotation of the rotary piston causes a volume of the first batching chamber to increase and a volume of the second batching chamber to decrease.

18. The batching device of claim 12, wherein rotation of at least one of the rotary pistons is configured to cause suction in at least one of the pouring channels in response to a decrease of a volume of the at least one the batching chambers.

19. The batching device of claim 12, wherein the case is configured to detachably couple to a tank via a pair of grooves and corresponding guides, wherein the pouring batching device further comprises:
   a handle positioned on a side of the pouring batching device, the handle configured to engage the corresponding guides to couple or decouple the pouring batching device from the tank.

20. The batching device of claim 12, wherein the pouring channels comprises a first pouring channel and a second pouring channel and the pouring ducts comprises a first pouring duct and a second pouring duct wherein the first pouring duct is configured to receive the substance from the first pouring channel and convey the substance to at least one of the internal ducts, and the second pouring duct is configured to receive the substance from the second pouring channel and release the substance from the pouring batching device, wherein the rotary piston is configured to cause suction in the second pouring duct in response to rotation of the rotary piston away from the second pouring channel.

* * * * *